US010356356B2

United States Patent
Rosella et al.

(10) Patent No.: US 10,356,356 B2
(45) Date of Patent: Jul. 16, 2019

(54) MULTIMEDIA COMMUNICATION AND DISPLAY DEVICE

(71) Applicant: Cute Circuit LLC, Stockholm, ME (US)

(72) Inventors: Francesca Rosella, Stockholm, ME (US); Ryan T. Genz, Stockholm, ME (US)

(73) Assignee: CUTE CIRCUIT LLC, Stockholm, ME (US)

(*) Notice: Subject to any disclaimer, the term of this patent is extended or adjusted under 35 U.S.C. 154(b) by 0 days.

(21) Appl. No.: 14/045,181

(22) Filed: Oct. 3, 2013

(65) Prior Publication Data

US 2014/0098206 A1     Apr. 10, 2014

Related U.S. Application Data

(60) Provisional application No. 61/709,633, filed on Oct. 4, 2012.

(51) Int. Cl.
*G06F 1/16*     (2006.01)
*G06F 3/01*     (2006.01)
(Continued)

(52) U.S. Cl.
CPC .............. *H04N 5/64* (2013.01); *G06F 1/163* (2013.01); *G06F 3/011* (2013.01); *G09F 21/026* (2013.01);
(Continued)

(58) Field of Classification Search
CPC .............. H04N 5/64; H04N 5/66; H04R 3/00
(Continued)

(56) References Cited

U.S. PATENT DOCUMENTS 4,308,572 A * 12/1981 Davidson ............. A41D 27/085
                                                36/137
4,781,347 A * 11/1988 Dickie ................. F16M 11/126
                                                248/183.1
(Continued)

FOREIGN PATENT DOCUMENTS

EP        0870294 B1 *  9/2000   ............... G09F 9/33
EP        0870294 B1 *  9/2000   ............... G09F 9/33

OTHER PUBLICATIONS

Buechley L. and M. Eisenberg, "Fabric PCBs, electronic sequins, and socket buttons: techniques for e-textile craft", Pers Ubiquit Comput, doi: 10.1007/s00779-007-0181-0, 2007.*
(Continued)

*Primary Examiner* — Richard A Hansell, Jr.
(74) *Attorney, Agent, or Firm* — Ladas & Parry LLP

(57) ABSTRACT

A garment having audio-video display capabilities, has a garment body bearing a a video display device. The display device is preferably mounted to a surface of the garment body whereby it cannot be seen unless activated. An audio reproduction device is also mounted to the garment body. Both the video and audio display/reproduction devices are controlled by a microprocessor system likewise mounted to the garment body. The processor system is capable of receiving video and audio data and control signals from a remote source, such as a smartphone, over a wireless communications system, such a Bluetooth system. In addition, the garment may itself have a camera and microphone to allow the wearer to record audio-visual material and display it on the garment system.

9 Claims, 4 Drawing Sheets

(51) Int. Cl.

| | |
|---|---|
| *H04N 5/64* | (2006.01) |
| *H04N 5/66* | (2006.01) |
| *H04N 5/77* | (2006.01) |
| *H04R 1/02* | (2006.01) |
| *H04R 3/00* | (2006.01) |
| *G09F 21/02* | (2006.01) |
| *G09F 27/00* | (2006.01) |
| *H04N 21/41* | (2011.01) |
| *H04N 21/414* | (2011.01) |
| *H04N 21/432* | (2011.01) |
| *H04N 21/433* | (2011.01) |
| *H04N 21/4223* | (2011.01) |

(52) U.S. Cl.
CPC ............... *G09F 27/00* (2013.01); *H04N 5/66* (2013.01); *H04N 5/77* (2013.01); *H04N 21/4122* (2013.01); *H04N 21/41407* (2013.01); *H04N 21/41415* (2013.01); *H04N 21/4223* (2013.01); *H04N 21/4325* (2013.01); *H04N 21/4334* (2013.01); *H04R 1/028* (2013.01); *H04R 3/00* (2013.01); *H04R 2201/023* (2013.01); *H04R 2420/07* (2013.01)

(58) Field of Classification Search
USPC .............................................. 348/61; 381/74
See application file for complete search history.

(56) References Cited

U.S. PATENT DOCUMENTS

| | | | | |
|---|---|---|---|---|
| 6,381,482 B1* | 4/2002 | Jayaraman | ............ | A61B 5/6805 |
| | | | | 600/388 |
| 6,511,198 B1* | 1/2003 | Erickson | .............. | A41D 27/085 |
| | | | | 313/510 |
| 6,611,244 B1* | 8/2003 | Guritz | ................ | A44C 15/0015 |
| | | | | 345/46 |
| 6,729,025 B2* | 5/2004 | Farrell | ...................... | B32B 3/08 |
| | | | | 29/825 |
| 6,930,608 B2* | 8/2005 | Grajales | ............... | A61B 5/0002 |
| | | | | 340/573.5 |
| 7,611,255 B1* | 11/2009 | Lagassey | ............... | A42B 1/244 |
| | | | | 362/103 |
| 7,682,034 B2* | 3/2010 | Asvadi | ...................... | G09F 9/33 |
| | | | | 362/103 |
| 7,769,412 B1* | 8/2010 | Gailloux | ................. | H04M 1/05 |
| | | | | 455/419 |
| 7,787,240 B2* | 8/2010 | Swain | ...................... | G06F 1/163 |
| | | | | 361/679.03 |
| 2005/0231490 A1* | 10/2005 | Golan | ........................ | G09F 9/33 |
| | | | | 345/204 |
| 2006/0007059 A1* | 1/2006 | Bell | ...................... | A41D 27/085 |
| | | | | 345/55 |
| 2006/0055771 A1* | 3/2006 | Kies | .................... | H04L 12/1822 |
| | | | | 348/14.03 |
| 2006/0291192 A1* | 12/2006 | Hill | ........................ | A41D 13/01 |
| | | | | 362/108 |
| 2007/0174515 A1* | 7/2007 | Sinclair | ............... | H04M 1/7253 |
| | | | | 710/62 |
| 2007/0206375 A1* | 9/2007 | Piepgras | .............. | A43B 1/0027 |
| | | | | 362/147 |
| 2009/0027566 A1* | 1/2009 | Wargon | .................... | G06F 1/163 |
| | | | | 348/739 |
| 2009/0310290 A1* | 12/2009 | Tennent | .................... | G09G 3/20 |
| | | | | 361/679.03 |
| 2011/0119812 A1* | 5/2011 | Genz | ....................... | F21V 23/04 |
| | | | | 2/244 |
| 2011/0129110 A1* | 6/2011 | Wolfe | ...................... | A41D 1/002 |
| | | | | 381/333 |
| 2011/0299715 A1 | 12/2011 | Kaiser | | |
| 2011/0314711 A1* | 12/2011 | Jumblatt | .................. | B65D 1/02 |
| | | | | 40/581 |
| 2012/0204307 A1* | 8/2012 | De Mattei | ............. | A41D 1/002 |
| | | | | 2/69 |
| 2013/0142393 A1* | 6/2013 | Lord | .................. | G06K 9/00671 |
| | | | | 382/105 |

OTHER PUBLICATIONS

Johnson E., YouTube video titled, "Flexible LED Panels you can wear: ETFLED" uploaded on Aug. 20, 2011. Corresponding web-link is: https://www.youtube.com/watch?v=cMTO_T6G0QA.*

Johnson E., YouTube video titled, "Flexible LED Panels you can wear: ETFLED" uploaded on Aug. 20, 2011—example image at 0:39 seconds is attached for illustration.*

Moore, D. "Philips illuminates IFA 2006 with production-ready Lumalive textile garments", Philips Research Press Release, May 3, 2007.*

Yam, M. "Philips Demonstrates LED Fabric Technology". Blog posted on Jan. 20, 2007 (article found at http://www.dailytech.com/Philips+Demonstrates+LED+Fabric+Technology/article5775.htm).*

Technical Information—DuPont Pyralux AP AI-Polyimide Flexible Laminate for flexible printed circuit applications, dated Jun. 2009—obtained from https://www.multi-circuit-boards.eu/fileadmin/pdf/leiterplatten_material/e_dupont_pyralux-ap-polyimid_www.multi-circuit-boards.eu.pdf.*

R. Dyer ("Dell Latitude E6400 LCD Ribbon Cable Removal and Installation", Sep. 8, 2011—retrieved from https://www.parts-people.com/blog/2011/09/08/dell-latitude-e6400-lcd-ribbon-cable-removal-and-installation/).*

S. Mueller ("PC Repair and Maintenance: In-depth Look at Power Supply", Feb. 28, 2003)—retrieved from http://www.informit.com/articles/article.aspx?p=31105&seqNum=4.*

D.I. Lehn et al. "e-TAGs: e-textile Attached Gadgets", 2004. Refer to https://vtechworks.lib.vt.edu/handle/10919/80538.*

R. Dyer ("Dell Latitude E6400 LCD Ribbon Cable Removal and Installation", Sep. 8, 2011—retrieved from https://www.parts-people.com/blog/2011/09/08/dell-latitude-e6400-lcd-ribbon-cable-removal-and-installation/) (Year: 2011).*

S. Mueller ("PC Repair and Maintenance: In-depth Look at Power Supply", Feb. 28, 2003)—retrieved from http://www.informit.com/articles/article.aspx?p=31105&seqNum=4 (Year: 2003).*

D.I. Lehn et al. "e-TAGs: e-textile Attached Gadgets", 2004. Refer to https://vtechworks.lib.vt.edu/handle/10919/80538 (Year: 2004).*

Technical Information—DuPont Pyralux AP AI-Polyimide Flexible Laminate for flexible printed circuit applications, dated Jun. 2009—obtained from https://www.multi-circuit-boards.eu/fileadmin/pdf/leiterplatten_material/e_dupont_pyralux-ap-polyimid_www.multi-circuit-boards.eu.pdf (Year: 2009).*

Buechley L. and M. Eisenberg, "Fabric PCBs, electronic sequins, and socket buttons: techniques for e-textile craft", Pers Ubiquit Comput, doi: 10.1007/s00779-007-0181-0, 2007 (Year: 2007).*

Johnson E., YouTube video titled, "Flexible LED Panels you can wear: ETFLED" uploaded on Aug. 20, 2011. Corresponding web-link is: https://www.youtube.com/watch?v=cMTO_T6GOQA. (Year: 2011).*

Johnson E., YouTube video titled, "Flexible LED Panels you can wear: ETFLED" uploaded on Aug. 20, 2011—example image at 0:39 seconds is attached for illustration. (Year: 2011).*

Moore, D. "Philips illuminates IFA 2006 with production-ready Lumalive textile garments", Philips Research Press Release, May 3, 2007. (Year: 2007).*

Yam, M. "Philips Demonstrates LED Fabric Technology". Blog posted on Jan. 20, 2007 (article found at http://www.dailytech.com/Philips-i-Demonstrates-i-LED-i-Fabric-i-Technology/article5775.htm (Year: 2007).*

Ballantines. tshirtOS :: The world's first programmable t-shirt. Aug. 2012 Retrieved from Internet: <URL:http://www.youtube.com/watch?v=q0GokKd2QRA>.

* cited by examiner

| byte# | 0 | 1 | 2 | 3 | 4 | 5 | 6 | 7 | 8 | 9 | 10 |
|---|---|---|---|---|---|---|---|---|---|---|---|
| | Header | | | | | H | e | l | l | o | |
| hex | 1 | 0 | 40 | 0 | 5 | 48 | 65 | 6C | 6C | 6F | F4 |
| dec | 1 | 0 | 64 | 0 | 5 | 72 | 101 | 108 | 108 | 111 | 244 |

MULTIMEDIA COMMUNICATION AND DISPLAY DEVICE

The present invention relates to a novel multi-media display and communications apparatus, and in particular to such an apparatus which may be incorporated into various products, and especially into wearing apparel.

BACKGROUND OF THE INVENTION

Humans are social animals. They engage each other through a variety of communication channels. They talk with each other, they take photographs and movies of each other, and through advances such as smart phones, they transfer and exchange information (and gossip) on a continuous basis, irrespective of where the parties the such exchange are located.

Humans also are expressive creatures. They express themselves both through the media that they employ to communicate with each other, as well as through their physical actions and the clothes they wear. As technology expands, there is an increasing melding of the different expressive modes and the communication channels by which people express themselves and share their thoughts and feelings with each other.

BRIEF DESCRIPTION OF THE INVENTION

The present invention provides for a multi-media communications device that allows the display of information in a unique and innovative personal manner. It comprises a microprocessor "brain" that controls audio and video display devices and allows for the wireless receipt of data from external sources to drive the display devices. Innovatively, the display devices are of a nature that allows them, and the associated drive and control components, to be integrated into a wide variety of products. In particular, they may be integrated into items of wearing apparel, such as shirts. With the video display device integrated into the front or back of a shirt, for example, the wearer can be an electronic billboard or movie screen, the shirt displaying video images that are received wirelessly and/or stored by the device. Speakers likewise integrated into the shirt can provide accompanying sound.

Control signals for the device may likewise be transmitted wirelessly to the processor, such as through known "Bluetooth" technology. The device may be linked through such a Bluetooth connection to a portable device under the control of the wearer, such as a smartphone or other device. Through commands entered through the smartphone, the wearer can direct the device to play audio-visual media as desired, whether transmitted by the remote device or generated or stored by the device. The device may incorporate other peripherals, such a camera or a microphone to allow it to record audio-video data, as well as sensors such as an accelerometer to permit the coordination between the recording or display of data and a physical action, such as a jump by the wearer. Because a preferred implementation of the invention is in the form of a t-shirt, the invention may be from time to time referred to herein as the "Shirt".

BRIEF DESCRIPTION OF THE DRAWINGS

A fuller understanding of the invention may be achieved upon consideration of the following detailed description of an illustrative embodiment thereof and the annexed drawings, wherein.

DETAILED DESCRIPTION OF THE INVENTION

Figure 1:
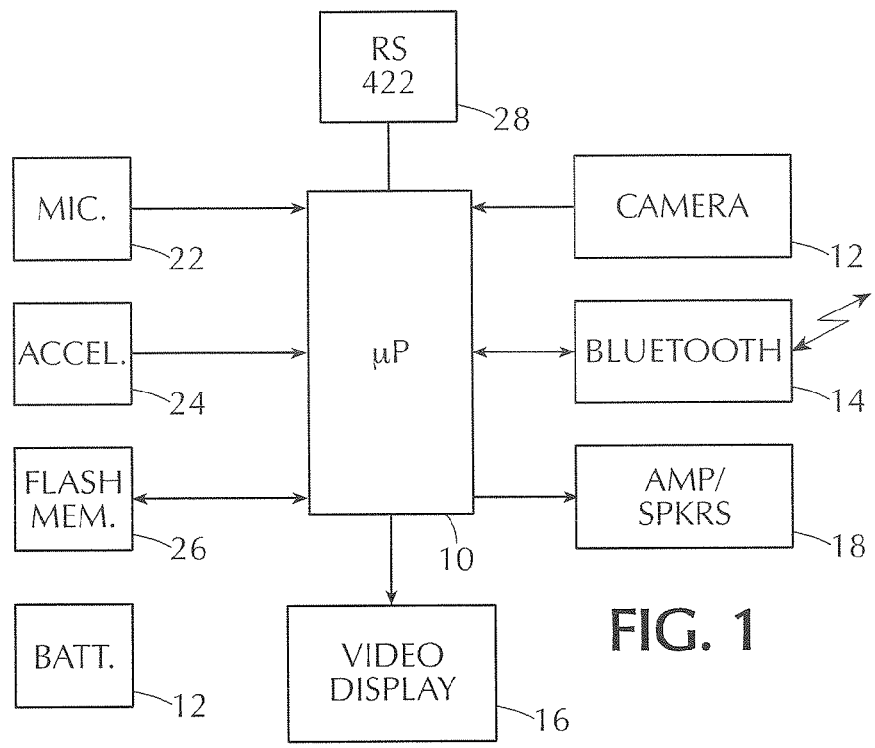
FIG. 1 is a block diagram of the operative elements of the invention.

As depicted in FIG. 1, the multi-media communications and display Shirt device of the present invention comprises a processor system having a microprocessor 10 that controls the operation of peripherals connected thereto and processes received data and instructions for the peripherals. It may be 32 bit system, such as an ATSAM3S processor. A battery pack power supply 12 powers the processor as well as all the other components of the system. As well known, the power supply may include, or be coupled to, charging, filtering and regulation circuitry needed to provide the power at the appropriate ratings for each of the devices it powers and to allow the battery to be recharged as needed.

The microprocessor provides the signals to operate the video display panel 16 and stereo speakers 18, which may be coupled to the microprocessor through appropriate amplification circuitry. The processor also controls the operation of a video camera 20 and a microphone 22, allowing the inputting of audio/video material. The camera may be coupled to the microprocessor through an appropriate interface as known, such as a CX93510 encoder, which takes the raw image data from the camera and converts it to a form usable by the microprocessor. In addition to the storage provided in the processor itself, external flash memory 26 may be provided for the processor, along with an RS422 interface 28. The memory allows for the retention of video and audio data for later display upon receipt of appropriate commands. A micro-accelerometer sensor 24, such as the Analog Devices model ADXL345, a three-axis unit that serves also as a tilt sensor, may also be operatively connected to the processor.

External operating instructions and display data are delivered to the processor 10 by a wireless receiver, such as Bluetooth receiver 14, which may be, for example, a Bluegiga Technologies WT32 unit. The Bluetooth receiver allows the device to be coupled to another Bluetooth-enabled device, such as a smartphone. The smartphone in turn is supplied with an application that allows it to generate the control signals appropriate to operate the device and transmit to the device data, such as text and image data, to be presented/displayed by the device. The application may allow, for example, images received by the smartphone's camera or stored by the smartphone to be transmitted to the device and shown on the device screen. To the smartphone or other Bluetooth device to which the Shirt is coupled the inventive device appears simply as another Bluetooth peripheral with its own application programming interface (API).

Figure 2:
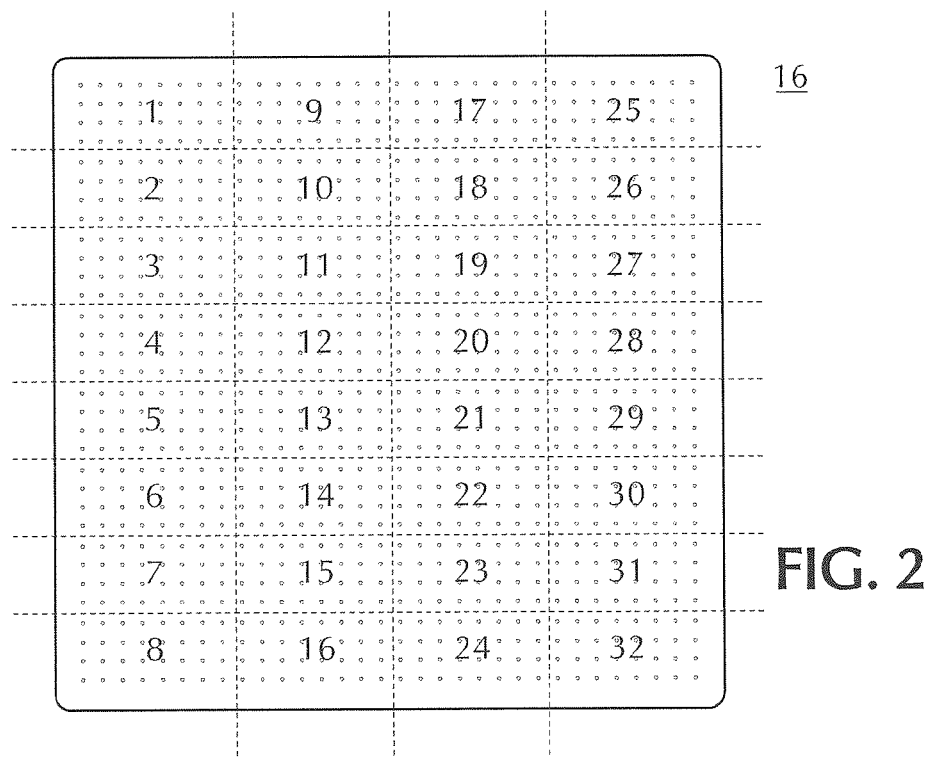
FIG. 2 is a depiction of the construction format of the video display of the invention.
Figure 2A:
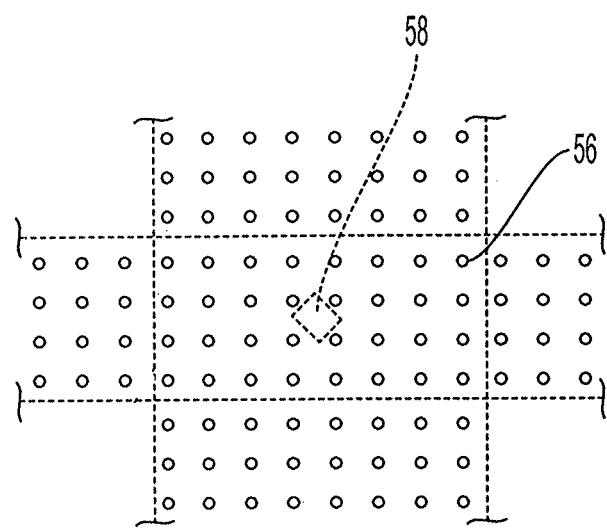
FIG. 2A is an enlarged depiction of a portion of the video display.

Video display 16 is preferably an LED matrix, configured and constructed to be both flexible and water resistant, allowing it to be mounted to fabric, such as a shirt front, in a manner that substantially preserves the wearability, washability, and flexibility of the garment. Preferably, it is fabricated as a two layer flexible printed circuit board (PCB) film of polyimide, 170 microns in thickness, with components mounted to both sides. The PCB may be mounted on the inside surface of the shirt fabric intended to be the video "screen" with two layers of a mesh fabric, preferably that known in the trade as "powermesh", a nylon/spandex blend fine mesh fabric serving as a diffuser between the PCB film and garment fabric. As depicted in FIG. 2, the LED matrix itself is divided into 32 sections, each of which comprises 32 multicolor LED devices arranged with 1 cm spacing in a 4×8 rectangular matrix, and driven by a microprocessor, such as an ATMEGA644M or P RISC microcontroller, as known in the art. FIG. 2A depicts a portion of the matrix illustrating the placement of a microprocessor 58 in a section, driving the LEDs 56 of the section. Each LED forms a pixel of the overall display. The LED sections or matrixes themselves are arranged to form a 32 by 32 pixel square display, with 1024 LED pixels total.

As known in the art, the LEDs of each section and the sections themselves are multiplexed and switched by the processors 58 such that each LED is sequentially provided with an appropriate signal to have it illuminate at the correct color and intensity to produce the desired overall image. Switching between the four rows of a section of LEDs may be performed by p-channel power MOSFETs, such as the FDME1023PZT, a small dual MOSFET, to minimize the board real estate needed, while the cathodes of the LEDs are led through appropriate load resistors to the corresponding processor switch outputs. The section processors are clock-matched to the main processor 12 to achieve a fast error-free data transfer rate and allow the video data to be delivered to the processors of the array with only a single signal control line and a ground, in addition to the lines carrying the data to be displayed.

Figures 3, 4:
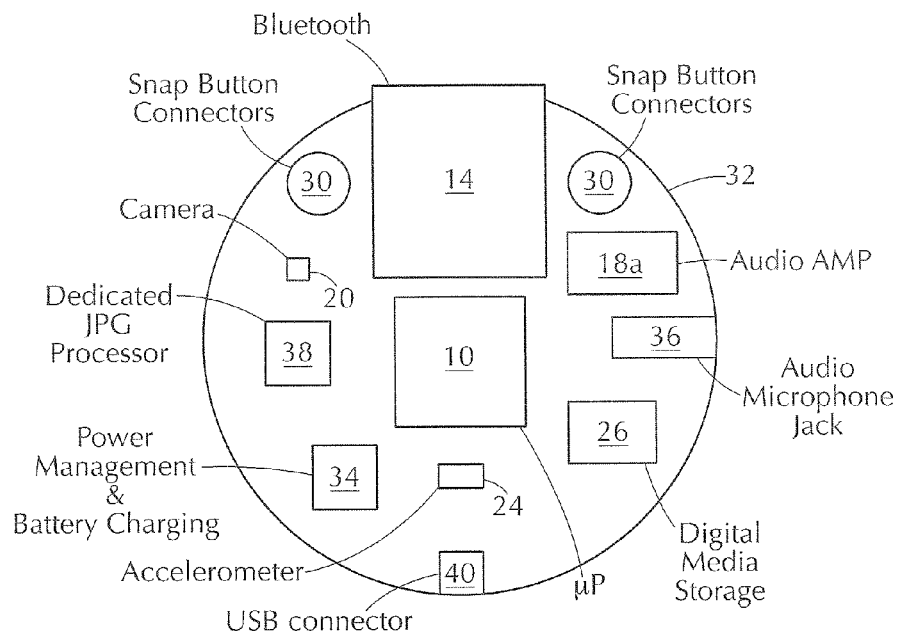
FIG. 3 is pictorial view of the layout of a printed circuit board carrying the main processor of the Shirt and other components.
FIG. 4 depicts the bytes in a wireless data transmission to the shirt for display of the word "Hello"

FIG. 3 depicts the arrangement of major components on a main PCB 32. The main PCB carries main "brain" microprocessor 10, as well as associated circuitry and components, including some of the peripherals, such as the camera 20 and accelerometer 24. The PCB board may be of multi-layer rigid design, with two snap connectors 30 connecting the board to the LED display through a TX (transmit) and a ground line. The PCB carrying the microprocessor and associated components may sit in an internal pocket on the shirt, and is thus removable, while the LED array is permanently affixed to the shirt. Given the different power demands of the microprocessor and other main PCB components on the one hand and the display matrix 16 on the other, the battery pack 12 may be in two parts, with power for the main PCB board being provided by a board-mounted supply (which may be part of the Bluetooth transceiver 14). Power for the matrix is supplied by another battery pack 52 (FIG. 5) located at the matrix and able to be disconnected therefrom for charging. An independent charger may be provided to charge both batteries, such as through USB ports. The main PCB may carry a power management and battery charging circuit 34 to condition and distribute battery power as appropriate to components. The main PCB is also connected to the video display 16 by a multi-conductor ribbon cable (not shown) carrying the display signal data. The ribbon cable is disconnectable from the PCB, as are the snap connectors 30, to allow the PCB to be removed from the pocket. Because the Shirt is also capable of recording video through camera 20 and audio through microphone 22, main PCB may also carry the video processor/encoder CX93510 38 for camera 20 as well as a jack 36 to input audio from the microphone 22, typically located remote to the board. Jack 36 may also be used to couple generated audio (amplified by amplifier 18a) to the speakers 18.

As indicated above, user-generated control commands for the microprocessor 10 are issued by the smartphone or other wireless device to which the Shirt is Bluetooth coupled. "Short" commands generated by the API in the phone, instructing the Shirt to take or report some action, are typically 4 bytes long. Each 4 byte command comprises a 2 byte header, a following single byte identifying the nature of the command, and a final, argument byte which sets any settings relevant to the command. If no argument is relevant, the last byte is zero.

"Long" commands can also be issued to carry or deliver a payload of data, such as a photo or text to be displayed, rather than to set a mode or function for the Shirt. At present the types of data to be sent to the Shirt are text and images. Thus there are only two long commands. Other long commands can be developed to send other types of data.

A long command comprises a 2 byte (bytes 0 and 1) header, followed by a command byte (byte 2) setting forth the type of data being delivered (e.g. hex 40 for text). Byte 3 is the address where the data transmitted is to be stored at the Shirt. The received data will overwrite any prior data at that location. The next byte (4) represents the payload length. For a text transmission the payload length is the actual number of characters in the phrase. The maximum length is thus 255. "Hello", for example, would have a payload length of 5, corresponding to the 5 letters in the word. If a group of commands include data that are to be displayed sequentially, the addresses for the data should be sequential.

The next bytes in the string are the actual bytes of the payload. For "Hello" bytes 5 through 9 would be used, each byte being the actual ASCII value for the corresponding letter or character. The final byte of the string is a checksum. FIG. 4 depicts the string for "Hello".

For sending images bytes 0 through 2 are of the same format as for a text (with, e.g., the command byte being decimal 65 to denote an image). The fourth byte denotes whether the image data is compressed. For compressed image data each pixel may be, for example, one of 256 colors, and thus can be represented by a single byte. With limited memory available, compression is presently required. With 3 color LEDs a single byte of data is sufficient to describe 256 colors, with the 8 available bits of each byte being allocated among the red, green and blue color channels. Red and green are allocated 3 bits each, while blue, the shades of which are less able to be differentiated by the human aye, being allocated 2 bits (3:3:2 compression), allowing 8 levels for red and green and 4 levels of blue to be designated and combined as needed to generate the 256 colors. With a LED image display area fixed at 32 by 30 pixels (which is smaller than the available display space), the total number of bytes of the payload will always be 960 (32×30). The bytes following the compression byte (bytes 5-965) are the 960 bytes of the payload. Again, the last byte of the message string is a checksum. The payload bytes are arranged in column order.

All instructions sent to the Shirt require a response. The response will differ depending on the command given. All responses, however, begin with a 1 byte header, followed by a 1 byte identification of the type of response, for example a general status update. The third byte of the response is the argument that indicates the value of the response, for example an acknowledge or negative acknowledge (error). In addition to the display of text and images/video transmitted from a remote control device via Bluetooth, the Shirt can also collect local data. Images captured by camera 20 can be transmitted by the Bluetooth connection to the coupled smartphone, while the microphone 22 can capture sounds which can be stored and played back through the speakers. Because of the provision of both the microphone and speakers, the Shirt can also be used to answer telephone calls directed to the coupled smartphone using well known methodology and can likewise broadcast music streamed by the smartphone. Accelerometer 24 can be used to trigger certain events. If the wearer of the shirt has the controlling smartphone, for example, the wearer can issue a command for the Shirt to take a particular action when the accelerometer has a certain input, such as sensing a jump. In that regard the accelerometer can function as a switch.

Figure 5:
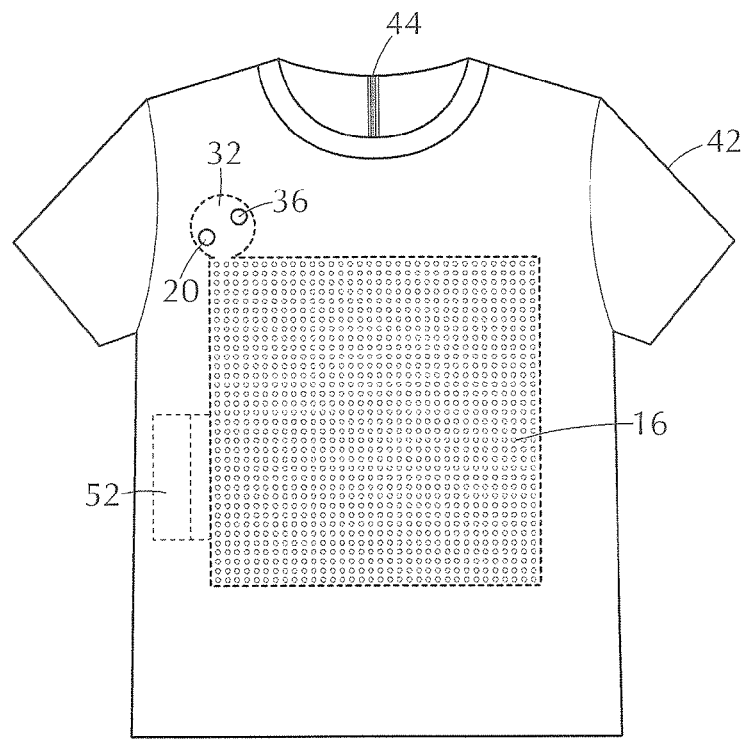
FIG. 5 is a depiction of a t-shirt bearing the Shirt invention, with components shown in phantom.
Figure 6:
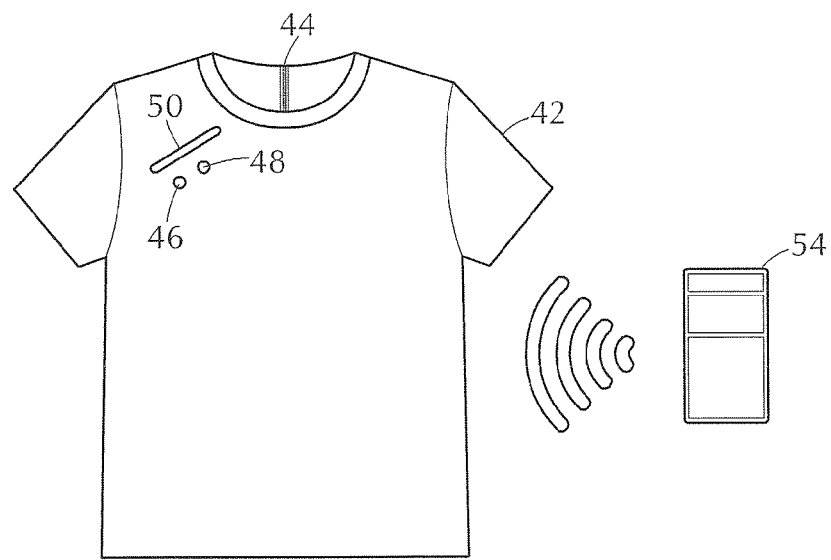
FIG. 6 is a depiction of the t-shirt of FIG. 5 illustrating the actual appearance of the garment, with the components hidden.

FIG. 5 depicts the orientation of components of the invention. Garment body 42 is in the form of a t-shirt, with the video display screen 16 and other Shirt components shown in phantom, as they are mounted upon the inner surface of the shirt front. PCB 32, bearing the main processor, camera and other components, is located in an internal pocket adjacent the video display which, as set forth above, is directly laminated upon the shirt inner surface. While the construction of the video display is such that the hand of the shirt is substantially retained, a zipper 44 is preferably provided at the back of the shirt to facilitate donning and removing the shirt. As further shown in FIG. 6, the components are not visible for the garment exterior, save for an entrance slot 50 for the internal PCB pocket, a small hole 46 in the garment aligned with the lens of camera 20 on the PCB board, and a hole 48 aligned with the audio and microphone jack 36, which at present provides the audio output and input through coupling with a plug of a headset (not shown) having earphones and a microphone. Control signals are sent by the remote transmitter, such a smartphone 54. Other audio systems, such as an external speaker system or garment-mounted speakers and a microphone can alternatively be provided to be plugged into the jack.

We claim:

1. A washable garment having audio-video display capabilities, comprising:
 a main garment body having front and rear fabric surfaces;
 a video display device comprising a water-resistant LED matrix positioned upon a flexible printed circuit board film behind the rear fabric surface of the garment body by a mesh fabric light diffuser between the LED matrix and the rear fabric surface, the garment body serving as a viewable screen for the video display device, the LED matrix having a plurality of sections each comprising multicolor LED devices and a microprocessor for controlling the LED devices;
 a receiver for receiving wireless video and audio command signals from a remote source;
 a processor system removably mounted upon the garment and coupled to the receiver and to the video display device and the audio reproduction device for processing the received command signals and generating display signals for the video display and audio reproduction devices, the construction of the video display device not adversely affecting the washability of the garment with the video display device being mounted thereto.

2. The garment of claim 1, wherein the LED matrix comprises 32 sections, each comprising 32 multicolor LED devices; the LED devices and the microprocessor mounted to a two layer polyimide circuit board film.

3. The garment of claim 1 wherein the receiver is a Bluetooth receiver.

4. The garment of claim 3 further comprising a remote Bluetooth-enabled device for generating and wirelessly transmitting the command signals to the receiver.

5. The garment of claim 1 wherein the processor system is removably located in a pocket of the garment remote from the LED matrix positioned behind and mounted to the garment body.

6. The garment of claim 5 wherein the processor system is mounted upon a circuit board, the circuit board further including at least one of a video camera, a microphone and an accelerometer coupled to the processor system, the garment body having an aperture for a lens of the camera, the circuit board being positioned within the pocket whereby the camera lens is aligned with the aperture, the processor allowing respective outputs from the video camera and microphone to be presented by the video display and audio reproduction devices.

7. The garment of claim 5 wherein the pocket is accessible from the exterior of the garment through a slot formed in the garment body.

8. The garment of claim 6 wherein the processor system is further removably coupled to at least one of a microphone and an earphone by a jack mounted to the circuit board, the garment body having a second aperture aligned with the jack for plug connection thereto from an exterior of the garment.

9. The garment of claim 1 further comprising at least one audio reproduction device mounted to a surface of the garment body.

* * * * *